United States Patent [19]
Brayden et al.

[11] Patent Number: 5,242,651
[45] Date of Patent: Sep. 7, 1993

[54] PRESSURE BALANCED PROCESSING OF COMPOSITE STRUCTURES

[75] Inventors: Thomas H. Brayden, Irving; Donald C. Darrow, Grand Prairie, both of Tex.

[73] Assignee: Vought Aircraft Company, Dallas, Tex.

[21] Appl. No.: 557,353

[22] Filed: Jul. 25, 1990

[51] Int. Cl.⁵ .................................. B32B 3/12
[52] U.S. Cl. ........................ 264/510; 156/285; 264/516; 428/116
[58] Field of Search ............... 156/197, 292, 285; 428/116, 117, 118; 264/510, 516

[56] References Cited

U.S. PATENT DOCUMENTS

| | | | |
|---|---|---|---|
| 2,952,579 | 9/1960 | Merriman | 428/118 |
| 3,138,506 | 6/1964 | Ross | 428/116 X |
| 3,902,944 | 9/1975 | Ashton et al. | 156/156 |
| 3,937,778 | 2/1976 | Tanaka | 264/102 |
| 3,962,506 | 6/1976 | Dunaboo | 156/156 X |
| 4,045,267 | 8/1977 | Davis et al. | 428/117 X |
| 4,132,755 | 1/1979 | Johnson | 264/102 X |
| 4,169,749 | 10/1979 | Clark | 156/156 |
| 4,331,495 | 5/1982 | Lackman et al. | 428/116 X |
| 4,565,595 | 1/1986 | Whitener | 156/156 |
| 4,567,007 | 1/1986 | Harder | 264/29.5 |
| 4,816,106 | 3/1989 | Turris et al. | 264/102 X |
| 4,826,106 | 5/1989 | Anderson | 428/116 X |
| 4,910,065 | 3/1990 | McKinney | 428/116 |

Primary Examiner—Henry F. Epstein
Attorney, Agent, or Firm—Richards, Medlock & Andrews

[57] ABSTRACT

A method of processing a composite structure in an autoclave involves producing a layup (10) with a low density honeycomb core (12) covered by resin impregnated composite face plies (14). The layup is sealed to a mold (18) under a vacuum bag (20). The layup is then cured in an autoclave under high temperatures and pressures. A vacuum is applied between the layup (10) and the vacuum bag (20) via a vacuum port (22), thus creating a pressure differential across the bag (20). This creates a compressive consolidating force on the composite face plies (14). Volatiles emitted during curing are drawn away through the vacuum port (22). The core (12) communicates with the autoclave by means of a pressurization tube (26) which penetrates the mold (18) and into the core (12), thus eliminating the pressure differential between the core (12) and the autoclave. Autoclave pressure is communicated throughout the entire core via perforations (13) in the honeycomb core (12).

19 Claims, 1 Drawing Sheet

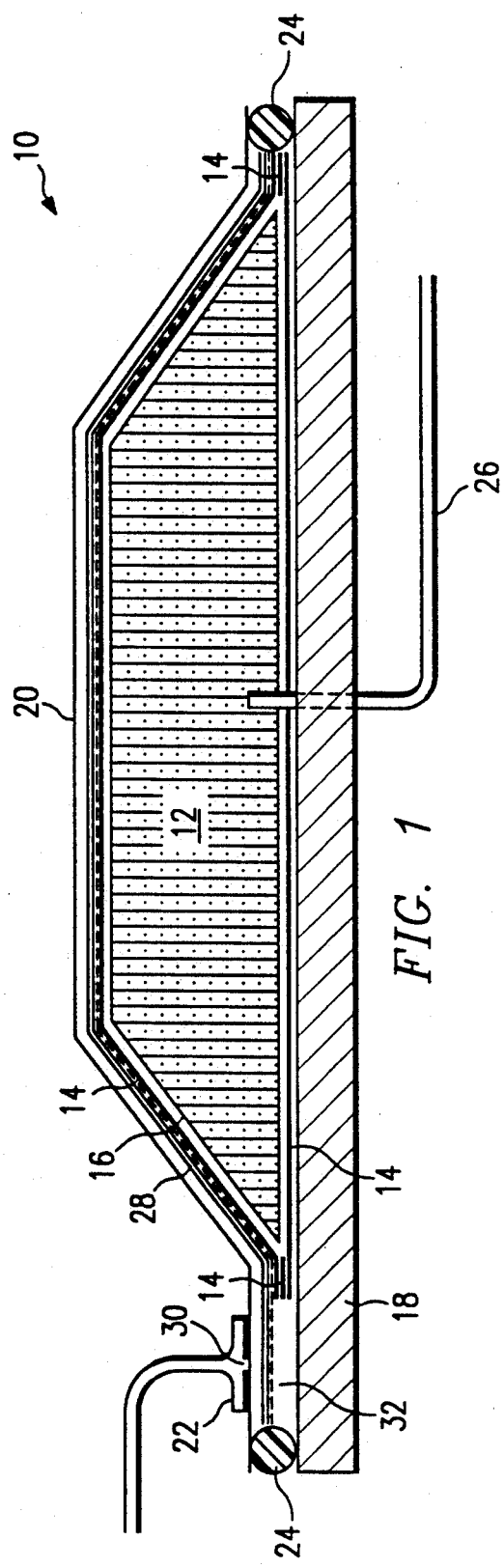
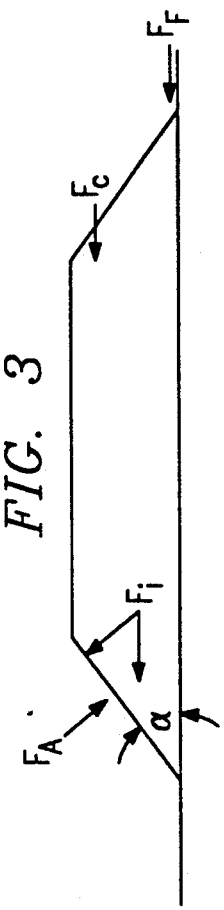
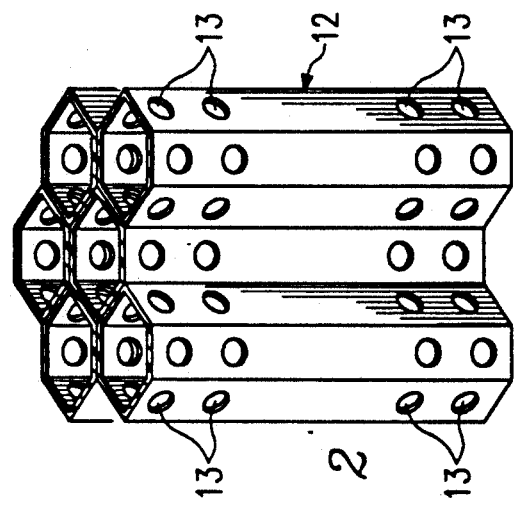
$$F_{NET} = F_A \sin\alpha - F_i - F_c - F_F$$
FIG. 3
FIG. 1
FIG. 2

PRESSURE BALANCED PROCESSING OF COMPOSITE STRUCTURES

TECHNICAL FIELD OF THE INVENTION

The present invention relates to the processing of composite structures. In particular, the invention relates to the pressure balanced process of forming a composite sandwich structure having a low density core covered by a resin impregnated fabric which is cured in place in an autoclave.

BACKGROUND OF THE INVENTION

The use of composite structures in aircraft is beneficial due to their high strength and low weight. Often a metal part can be replaced by a composite structure at one-tenth the weight. The composite structure often consists of a low density core covered by a resin impregnated fabric, or prepreg, in a "layup." The core is typically a block structure with angled ends, or "ramps", to facilitate application of the o prepreq. The core may be comprised of a plurality of hexagonal or over-expanded cells adjacent and attached to each other. The layup is then cured in an autoclave at temperatures of 250° to 400° Fahrenheit and pressures of 30–100 pounds per square inch. At these temperatures and pressures, the composite structure will cure. While curing, the resin in the prepreg will soften, flow, and permeate the upper portions of the core.

A problem with this method of making composite structures develops due to the pressure differential between the autoclave and the composite structure core. The pressure exerted may cause the low density core to collapse or shift, deforming the structure. A number of patents disclose methods which attempt to overcome this problem through the use of internally applied pressure. These include U.S. Pat. No. 3,138,506 to Ross, U.S. Pat. No. 3,962,506 to Dunahoo, and U.S. Pat. No. 4,169,749 to Clark. For example, Ross discloses a method of making an article of stiffened fibrous material which includes the use of fibrous material formed under pressure with the article being inflated during the process. A tubular valve or inflation nipple may be built into or attached to the closed body to permit inflation. Additionally, Dunahoo discloses a multi-chamber cellular structure and method of manufacture which includes a plurality of shells. The shells are composed of a plastic having embedded therein fibrous reinforcing material. During the manufacturing process, pressure is introduced inside the structure so as to expand the structure into a mandrel.

A second problem develops during the processing of composite structures in an autoclave due to the emission of volatiles from the materials used in the core. During the curing process, these gases can bubble out of the materials, causing voids or unsmooth surfaces. Alternatively, the core may "seal off" allowing internal gas pressure to increase to unsafe levels. In either case, the composite structure is damaged. Several methods have been developed to facilitate the removal of volatiles from the layup during the curing process. These include U.S. Pat. No. 4,816,106 to Turis et al., U.S. Pat. No. 4,132,755 to Johnson, and U.S. Pat. No. 3,937,778 to Tanaka. For example, Turis et al. discloses a method of controlled curing of composites which includes means for removing volatiles from the layup during the curing process. The layup is deposited over a release material adjacent to the mold. Volatiles removal is then accomplished by depositing a breather strip about the periphery of the layup. The layup and the breather material are enclosed within a vacuum bag which is sealed to the mold by means of sealing strips. A connecting tube is then provided to place the breather material in communication with the vacuum source. The layup is then heated to a temperature which will permit the escape of volatiles.

A need exists for a method or process of pressure balanced processing of co-cured composite sandwich structures. The present invention provides such a method which addresses the problems of core collapse and the emission of volatile gases, and is suitable for use in an autoclave environment.

SUMMARY OF THE INVENTION

This invention relates to a novel method of processing composite structures in an autoclave environment. The process involves equilibrating the pressure between the autoclave and the core of the composite structure while curing the composite structure. Pressure equilibration can be accomplished by inserting a tube through the work table on which the composite structure is laid up, through the prepreg, and into the core of the composite structure. This tube allows pressure communication between the autoclave and the core. Pressure equilibration may be hindered by the inability of the tube to communicate with the entire core. This problem can be solved by perforating the core to create air passageways by which the high autoclave pressure may reach each and every portion of the core.

The autoclave pressure is regulated throughout the cure cycle. This relationship of the force components is described by the equation:

$$F_h = F_a \times \sin(\alpha) = F_c + F_f + F_i$$

where:
$F_h$ = horizontal component of the force tending to collapse the core;
$F_a$ = force due to autoclave pressure;
$F_c$ = force arising from the inherent strength of the core in the lateral direction;
$F_f$ = force resisting movement due to friction;
$F_i$ = internal force from gas pressure within the core; and
$\alpha$ = core ramp angle.

Equilibrium is achieved when the internal forces balance the horizontal component of the force exerted by the autoclave. In this state, the sum of the internal and external forces is zero, as expressed by the following equation.

$$F_{net} = F_a \times \sin(\alpha) - F_c - F_f - F_i = 0$$

By maintaining the internal pressure equal to $F_h$, which is the sum of the force due to internal gas pressure, the force arising from inherent strength of the core in the lateral direction, and any force resisting movement due to friction, the processing pressure may be increased to an optimum without danger of core collapse. This also prevents porosity and void growth which occur at low pressures. A vacuum bag may be placed over the composite structure and sealed to the work table around the composite structure. The vacuum bag is typically an impervious gas tight film ranging from 0.001 inch to 0.003 inch in thickness. This vacuum bag prevents autoclave air from contacting the surface of the composite structure. It also prevents volatile gases emitted from the curing composite from entering the autoclave. A vacuum port penetrates the vacuum bag and allows for evacuation of volatiles and the creation of low pressure on the structure side of the bag. The differential pressure between the two sides of the vacuum bag creates a compressive net force on the composite face plies of the composite structure.

Excessive volatile gas pressure within the core may also be evacuated through the tube inserted info the core. Alternatively, an inert gas such as nitrogen may be pumped through the tube into the core to balance the autoclave pressure. Lastly, autoclave pressures may be balanced by introducing solvents or "blowing agents" into the core structure which tend to produce volatiles which exert a gas pressure opposing the applied autoclave pressure.

BRIEF DESCRIPTION OF THE DRAWINGS

For a more complete understanding of the present invention, and for further details and advantages thereof, reference is now made to the following detailed description taken in conjunction with the accompanying drawings, in which:

FIG. 1 is a sectional view of the system for internal pressurization of core panels;

FIG. 2 illustrates the open-celled, interconnected nature of the low-density core; and FIG. 3 schematically illustrates the pressure differential experienced between the autoclave and the composite structure core.

DETAILED DESCRIPTION

The present invention is a process for pressure balanced curing of a composite sandwich structure that overcomes many of the disadvantages found in the prior art. Referring to FIG. 1, a cross-section of a layup 10 embodying the present invention is disclosed. The basic layup is comprised of composite face plies 14 and filler/doubler plies (not shown) surrounding a core 12 usually with ramped ends 16.

One composite face ply 14 is laid on a work table or mold 18. The core 12 is then laid on top of the composite face ply 14. Additional composite face plies 14 and filler/doubler plies are then laid on top of and around the edge of the core 12. A breather material 28 may then be laid on top of a separator film 32 covering the final composite face ply. A vacuum bag 20 is then placed over the layup 10. The bag 20 is sealed around the layup 10 onto the mold 18 by bag sealant 24. A vacuum port 22 communicates with an external source for vacuum or pressure. The mold 18 with the layup 10 and vacuum bag 20 on top of it is then inserted into an autoclave. The breather material 28 provides a flow path for gases emitted by the layup to the vacuum port 22. The breather material can be polyester mat or an unimpregnated glass fabric. The separator film 32 allows for easier removal of the breather material from the layup.

FIG. 2 illustrates the core 12 which is a lightweight material often formed of hexagonal sided cells. The intended function of the core is to act as a stiffening medium. Upper and lower composite face plies 14 with honeycomb core 12 bonded in between produces a lightweight stiff structure. The core 12 can consist of a variety of materials with a variety of cell sizes. Currently, core materials include aluminum, aramid paper and glass. The cell sizes can range from 0.125 inch to 0.375 inch in cross section. Typical densities for these materials range from 2 to 4 pounds per cubic foot. Examples of such material are NOMEX honeycomb or bias-weave honeycomb reinforced phenolic (HRP). NOMEX honeycomb is produced by E.I. duPont de Nemours & Co. of Wilmington, Del. Bias weave HRP is a bias weave glass fiber reinforced phenolic produced by Hexcel in Graham, Tex.

The present method permits pressure equilibration between adjacent cells. The pressurization tube 26, as seen in FIG. 1, serves to introduce the autoclave pressure into the particular cell where the tube 26 penetrates the mold 18. The pressurization tube 26 is composed of corrosion resistant material such as stainless steel, chrome-plated steel tubing, or nickel-plated steel tubing. For the pressure differential to be zero between the autoclave and the core volume, the pressure introduced into that single cell must be communicated to all the other cells in the core. As illustrated in FIG. 2, pressure communication paths are needed from the interior of one cell to the interior of the neighboring cell and may be provided by perforations 13. For cells constructed of aluminum or aramid paper, perforations 13 must be made in the cell walls. However, if the material of construction is sufficiently porous, pressure communication will occur automatically. For example, low density HRP glass phenolic core with a very light coating of phenolic resin on the glass fiber bundles will exhibit open holes or spaces in the weave of the glass. Alternatively, dry fabrics such as glass, Kevlar or graphite are porous enough to permit gas flow. These dry fabrics may be placed against the core face prior to any resin flow, pressure introduced into one cell of the core via the pressurization tube 26 can communicate with other cells by passing through the dry fabric which overlays the other cells. However, after the resin begins to flow, this fabric is impregnated and incorporated into the structure and it can no longer transmit pressure.

The vacuum bag 20, as shown in FIG. 1, is an impervious gas tight film ranging from 0.001 to 0.003 inches in thickness. The vacuum bag materials can be nylon, Kapton, rubber, or other suitable materials. The material chosen must be appropriate for the maximum temperature encountered in the cure cycle. The function of this film 2 is to prevent autoclave air from entering the region on the side of the bag next to the layup 10. The vacuum bag material is laid over the layup 10 and is sealed around the entire periphery with a bag sealant 24. This isolates the referenced space from contact with the autoclave interior. Contact with exterior sources occurs through the vacuum port 22 that penetrates the bag 20 at port 30 and communicates through a hardware train with either an external source of pressure or vacuum. The overall effect of the vacuum bag 20 is to cause a high pressure to be isolated on the autoclave side from the lower pressure on the tool side. The autoclave interior and the pressurized hot gases within it form a closed system. This space between the tool side of the bag and the composite face plies forms another system. The region under the bag and above the face plies can be open to the external atmosphere or to a vacuum source. When connected to a vacuum source or open to atmospheric pressure, a differential pressure is created across the vacuum bag 20. This differential pressure creates a net compressive force on the composite face plies during curing. Entry of autoclave gases into this space would cause a loss of the differential pressure across the bag 20 and defeat its function. A necessary condition for this compaction to occur is that the composite face plies 14 must be gas tight. A typical three ply skin will not permit gas pressure equilibration across it.

FIG. 3 illustrates the relationship between autoclave pressure $F_a$, the core's internal gas pressure $F_i$, the ramp angle $\alpha$, the force arising from the inherent lateral strength of the core $F_c$ and the force resisting movement due to friction $F_f$. If the difference between the force acting horizontally on the ramped end 16 and the interior of the core volume exceeds a predetermined level, approximately 6 psi in many cases, the core will collapse in an accordion-like fashion. Introduction of the pressure into the core interior via the pressurization tube 26 and its subsequent equilibration throughout the core volume ensures that the pressure differential between the autoclave air and the interior core volume remains close to zero. As discussed, pressure may be introduced into the core by allowing tube 26 to contact the autoclave environment. In an alternative embodiment, excessive pressure within the core (i.e., produced by the curing of core materials) may be also withdrawn through tube 26. In another embodiment, pressure equilibration is accomplished by pumping an inert gas through tube 26 into the core. In a final embodiment, $F_i$ is increased by introducing solvents or "blowing agents" into the core which produce volatiles during curing. Typical blowing agents include powdered $CO_2$ or acetone and methyl ethyl ketone. Using these arrangements there will be no excessive internally directed forces, which, when not counterbalanced, cause collapse of the core. These arrangements also permit designs utilizing ultralight cores and steep ramp angles. At the same time that the core is prevented from collapsing, the composite face plies are compacted by the pressure differential existent across the bag and across the composite face plies.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the invention.

We claim:

1. A method of processing a composite structure comprising:
   (a) laying at least a first resinous composite sheet on a mold;
   (b) placing an open-celled, low-density core on said first resinous composite sheet;
   (c) laying at least one additional resinous composite sheet on top of said open-celled, low-density core such that at least said first resinous composite sheet, said open-celled, low-density core, and said at least one additional resinous composite sheet form a composite structure;
   (d) curing said composite structure in an autoclave under conditions of increased autoclave temperature and autoclave pressures; and
   (e) equilibrating the autoclave pressure and the pressure in the cells of the open-celled, low-density core in said composite structure during the curing of said composite structure to avoid pressure induced damage to said open-celled, low-density core during the curing of said composite structure.

2. The method of claim 1 wherein said open-celled, low-density core has ramped edges.

3. The method of claim 1 wherein said equilibrating the pressure comprises:
   (a) introducing autoclave pressure into said open-celled, low-density core in said composite structure during the curing of said composite structure; and
   (b) communicating the thus introduced autoclave pressure throughout the cells of said open-celled, low-density core.

4. The method of claim 3 wherein said open-celled, low-density core is formed of a plurality of cells with the walls of the cells being perforated in order to create air flow passages among the cells.

5. A method of processing a composite structure in an autoclave comprising:
   (a) laying up a composite structure on a mold, including the substeps of:
      (1) laying at least a first resinous composite ply on the mold;
      (2) placing an open-celled, low-density core on said at least a first resinous composite ply; and
      (3) laying at least one additional resinous composite ply over the top of said open-celled, low-density core such that said at least a first resinous composite ply, said open-celled, low-density core, and said at least one additional resinous composite ply form a composite structure; and
   (b) enclosing said composite structure within a vacuum bag;
   (c) curing said composite structure within said vacuum bag in said autoclave by applying to the exterior of said vacuum bag increased autoclave temperatures and autoclave pressures;
   (d) equilibrating the pressure within the cells of the open-celled, low-density core of the composite structure with the autoclave pressure being applied to the exterior of said vacuum bag during the curing of said composite structure; and
   (e) compressing the composite structure during the curing of said composite structure.

6. The method of claim 5 wherein said open-celled, low-density core has ramped edges.

7. The method of claim 5 wherein said laying up further comprises laying a breather material between said at least one additional resinous composite ply and said vacuum bag.

8. The method of claim 7 wherein said laying up further comprises laying a separator film between said at least one additional resinous composite ply and said breather material.

9. The method of claim 5 wherein said enclosing said composite structure within a vacuum bag comprises:
   (a) laying a gas impervious film over the composite structure on said mold; and
   (b) sealing said gas impervious film to said mold, thereby forming a vacuum bag, such seal being capable of sustaining a vacuum within said vacuum bag.

10. The method of claim 5 wherein said curing comprises:
   (a) placing said composite structure in said autoclave;
   (b) subjecting said composite structure in said autoclave to increased autoclave temperatures for such time required to cure said first resinous composite ply and said at least one additional resinous composite ply; and (c) subjecting said composite structure to increased autoclave pressure in said autoclave for such time required to bond said first resinous composite ply and said at least one additional resinous composite ply to said open-celled, low-density core.

11. The method of claim 5 wherein said equilibrating the pressure comprises:

penetrating said open-celled, low-density core of the composite structure with a tube, said tube having one end within said open-celled, low-density core and the other end open to the autoclave such that autoclave pressure entering the open-celled, low-density core through said tube can diffuse throughout the open-celled, low-density core to equilibrate the pressure in the cells of the open-celled, low-density core of said composite structure with the autoclave pressure being applied to the exterior of said vacuum bag during the curing of said composite structure.

12. The method of claim 5 wherein said equilibrating the pressure comprises:

(a) penetrating said open-celled, low-density core of the composite structure with a tube, said tube having one end within said open-celled, low-density core and the other end open to the autoclave; and (b) allowing the passage through said tube of excessive volatile gas pressure produced within the open-celled, low-density core during said curing to equilibrate the pressure in the cells of the open-celled, low-density core of said composite structure with the autoclave pressure being applied to the exterior of said vacuum bag during the curing of said composite structure.

13. The method of claim 5 wherein said equilibrating the pressure comprises:

(a) penetrating said open-celled, low-density core of the composite structure with a tube, said tube having one end within said open-celled, low-density core and the other end in communication with a source of pressurized inert gas; and (b) injecting said pressurized inert gas into said open-celled, low-density core during said curing to equilibrate the pressure in the cells of said open-celled, low-density core of the composite structure with the autoclave pressure being applied to the exterior of said vacuum bag during the curing of said composite structure.

14. The method of claim 5 wherein said equilibrating the pressure comprises introducing solvents or blowing agents into the open-celled, low-density core which produce volatiles during the curing of said composite structure to equilibrate the pressure in the cells of said open-celled, low-density core of the composite structure with the autoclave pressure being applied to the exterior of said vacuum bag during the curing of said composite structure.

15. The method of claim 5 wherein said equilibrating the pressure comprises laying a dry fabric, which is porous enough to permit gas flow therethrough, between said open-celled, low-density core and said at least one additional composite ply prior to said curing.

16. The method of claim 15, wherein said dry fabric is selected from the group consisting of glass, Kevlar, and graphite.

17. The method of claim 5 wherein compressing the composite structure comprises creating a pressure differential across said vacuum bag.

18. The method of claim 17 wherein creating a pressure differential across said vacuum bag further comprises evacuating any volatile gases emitted into said vacuum bag by said composite structure during said curing.

19. A method of pressure balanced processing of composite structures in an autoclave comprising:

(a) laying up a composite structure on a mold, said composite structure comprising an open-celled, low-density core which is capable of collapse and which is surrounded by resin-impregnated fabric plies;

(b) sealing a gas impervious vacuum bag over said composite structure and to said mold, said vacuum bag being penetrated by a port connected to a means to create a vacuum source;

(c) curing the composite structure within the autoclave at autoclave temperatures and at autoclave pressures adequate to affix said fabric plies to said open-celled, low-density core;

(d) equilibrating the pressure within the open-celled, low-density core in said composite structure with the autoclave pressure by penetrating said open-celled, low-density core with a tube open to said autoclave pressure and diffusing said autoclave pressure within said open-celled, low-density core; and (e) compressing the composite structure, during the curing of the composite structure, by creating with said vacuum source a pressure differential across said vacuum bag by evacuating from said vacuum bag volatile gases emitted into said vacuum bag by the curing of the composite structure.

* * * * *